(12) United States Patent
Zalka

(10) Patent No.: US 6,947,404 B1
(45) Date of Patent: Sep. 20, 2005

(54) AUTOMATIC WAP LOGIN

(75) Inventor: Erno Zalka, Gyor (HU)

(73) Assignee: Nokia Corporation, Espoo (FI)

( * ) Notice: Subject to any disclaimer, the term of this patent is extended or adjusted under 35 U.S.C. 154(b) by 624 days.

(21) Appl. No.: 09/707,061

(22) Filed: Nov. 6, 2000

(51) Int. Cl.[7] ............................................... H04Q 7/24
(52) U.S. Cl. ..................... 370/338; 370/401; 455/411; 709/217; 709/237; 713/201
(58) Field of Search ............................... 370/338, 400, 370/401; 709/227–229; 713/200–202; 455/410–411

(56) References Cited

U.S. PATENT DOCUMENTS

| | | | | |
|---|---|---|---|---|
| 6,636,894 B1 | * | 10/2003 | Short et al. | ................... 709/225 |
| 6,643,782 B1 | * | 11/2003 | Jin et al. | ..................... 713/201 |
| 6,741,853 B1 | * | 5/2004 | Jiang et al. | .................. 455/418 |
| 2001/0000358 A1 | * | 4/2001 | Isomichi et al. | ............ 713/201 |
| 2001/0044893 A1 | * | 11/2001 | Skemer | ....................... 713/153 |
| 2004/0073713 A1 | * | 4/2004 | Pentikainen et al. | ......... 709/249 |

OTHER PUBLICATIONS

Perkins, Charles E., Mobile IP Joins Forces with AAA, Nokia Research Center, Aug. 2000, IEEE Personal Communications, 1070–9916, pp. 59–61.*

* cited by examiner

*Primary Examiner*—Brian Nguyen
*Assistant Examiner*—Tri H. Phan
(74) *Attorney, Agent, or Firm*—Cohen, Pontani, Lieberman & Pavane

(57) ABSTRACT

A system for connecting wireless terminals to a WAP gateway and thence to the Internet for providing content to the wireless terminals from Internet web servers includes an AutoLogin proxy and an AutoLogin database associated with the WAP gateway. On an initial login of a particular terminal to a particular web server an entry is made in the AutoLogin database of the user identification, the server URL, and the user-name/password pair required for that user to log in to that server. On subsequent logins to the server the proxy retrieves the user-name/password pair from the database, thus freeing the user of the necessity to enter it for each login which might be cumbersome to do given the limited input facilities provided on wireless terminals.

17 Claims, 5 Drawing Sheets

| User ID | Server URL | Login Name | Password |
|---|---|---|---|
| -------- | -------- | -------- | -------- |
| 212.555.1212 | www.bigsite.com | harry42 | presto |
| 212.555.1212 | www.greatsite.com | harry42 | opensesame |
| 212.555.1212 | www.paysex.com | lecher42 | iloveporn |
| 914.555.9999 | www.bigsite.com | joesmith | rumplestiltskin |
| -------- | -------- | -------- | -------- |

AutoLogin Database 210

Fig. 3

AUTOMATIC WAP LOGIN

BACKGROUND OF THE INVENTION

1. Field of the Invention

The present invention relates to servicing Wireless Application Protocol requests over a network, and particularly to automating the process of logging in to obtain such servicing.

2. Description of the Related Art

As the use of wireless devices (wireless telephones, pagers, palmtop devices, etc.) has proliferated, and as the use of the Internet for obtaining data services through personal computers (PCs) has proliferated, users wish to have some measure of access to Internet data services through their wireless devices. A protocol called Wireless Application Protocol (WAP) has been developed by leaders of the telecommunications industry for interfacing wireless devices to Internet gateways. A language called Wireless Mark-up Language (WML) has similarly been developed for efficiently communicating Internet data to wireless devices.

Typically, a user subscribing to an Internet service, regardless of whether through a personal computer or a wireless device, "logs in" to a server providing a desired service. Logging in typically requires entry of a user name and an associated password. Entering these items on a PC, which typically has a full-size keyboard, is relatively easy. A wireless device, however, is typically much more limited in its data entry capabilities, and thus the entry of such textual items is more difficult.

There is thus a need to simplify logging in to network servers from wireless devices.

SUMMARY OF THE INVENTION

An object of the present invention is to simplify logging in to network servers through wireless devices.

According to one aspect of the invention, a proxy is incorporated into a WAP gateway. The proxy keeps a file in which it creates an entry containing the user's user-name/password pair each time each user first logs into a server or Internet website. On subsequent logins of that user to that server or website the corresponding user-name/password pair is retrieved in the proxy and forwarded to the server or website.

In another aspect of the invention, the retrieved user-name/password pair is displayed to the user for possible modification before forwarding to the server.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference numerals denote similar elements:

FIG. 3 shows typical entries in the AutoLogin database shown in FIG. 2;

DETAILED DESCRIPTION OF THE PRESENTLY PREFERRED EMBODIMENTS

Figure 1:
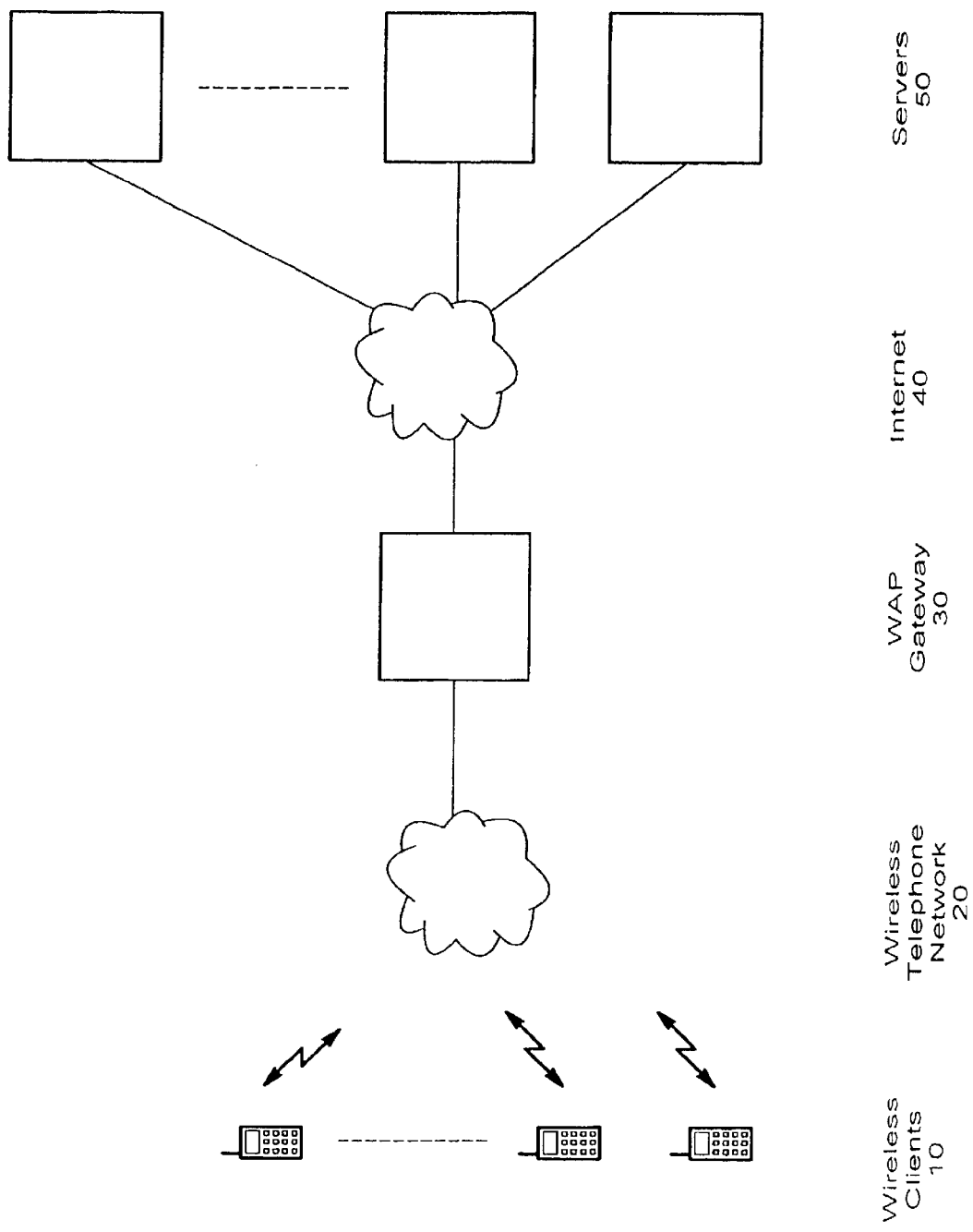
FIG. 1 is a high-level block diagram of wireless clients connected to Internet servers according to the prior art.

FIG. 1 is a high-level block diagram of pertinent portions of a system in which wireless clients may be served by Internet servers. Wireless clients 10 communicate with wireless telephone network 20 through which they communicate with one another, or with a WAP gateway 30. (There may be many WAP gateways 30, only one of which would be used by a particular wireless client 10 at a given time, and only one of which is shown.) WAP gateway 30 enables interfaces wireless clients 10 to data communications via Internet 40 from web servers 50.

When a wireless client 10 has contacted a server or Internet website 50, the wireless client 10 must typically log in to the server 50 by providing a user name and a password. Entry of the user name and password may be cumbersome or inconvenient on a wireless device which typically has limited data entry capabilities.

Figure 2:
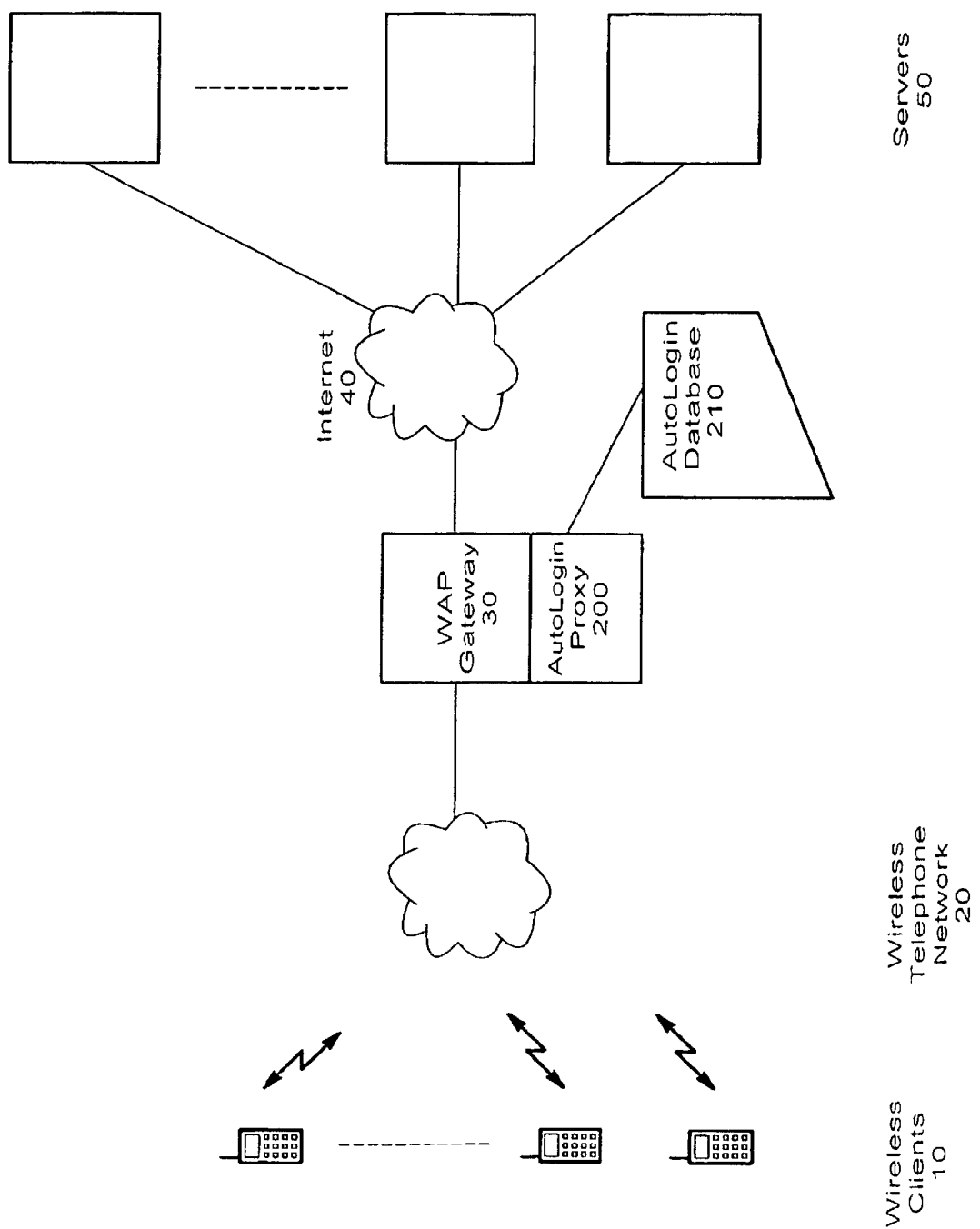
FIG. 2 is a high-level block diagram of wireless clients connected to Internet servers according to the present invention.

FIG. 2 illustrates the system with the addition of the present invention. Associated with each WAP gateway 30 is an AutoLogin Proxy 200 and an AutoLogin database 210, used by the invention to facilitate logging in to a server 50 from a wireless client 10.

FIG. 3 shows typical entries in AutoLogin database 210. For each wireless client (identified by a User ID, typically the telephone number) database 210 contains one record for each server 50 (identified by uniform resource locator (URL)) the user has logged in to. Included in each such record is the login-name/password pair used by the identified user to log in to the identified server. A user should use a different password for each server so that compromising of one password will not allow an intruder to enter other servers impersonating the user. Further, a user may have different user names, for a variety of reasons including the preservation of anonymity at sensitive servers. For example, in FIG. 3, for the user whose phone number is 212.555.1212 it is possible to tentatively determine from his user name of "harry42" that his first name is "Harry" when he logs into servers "bigsite" or "greatsite". But when he logs into "paysex" he uses an anonymous user name that, though possibly descriptive of his traits, does not facilitate any guesses about his actual name.

Figure 4:
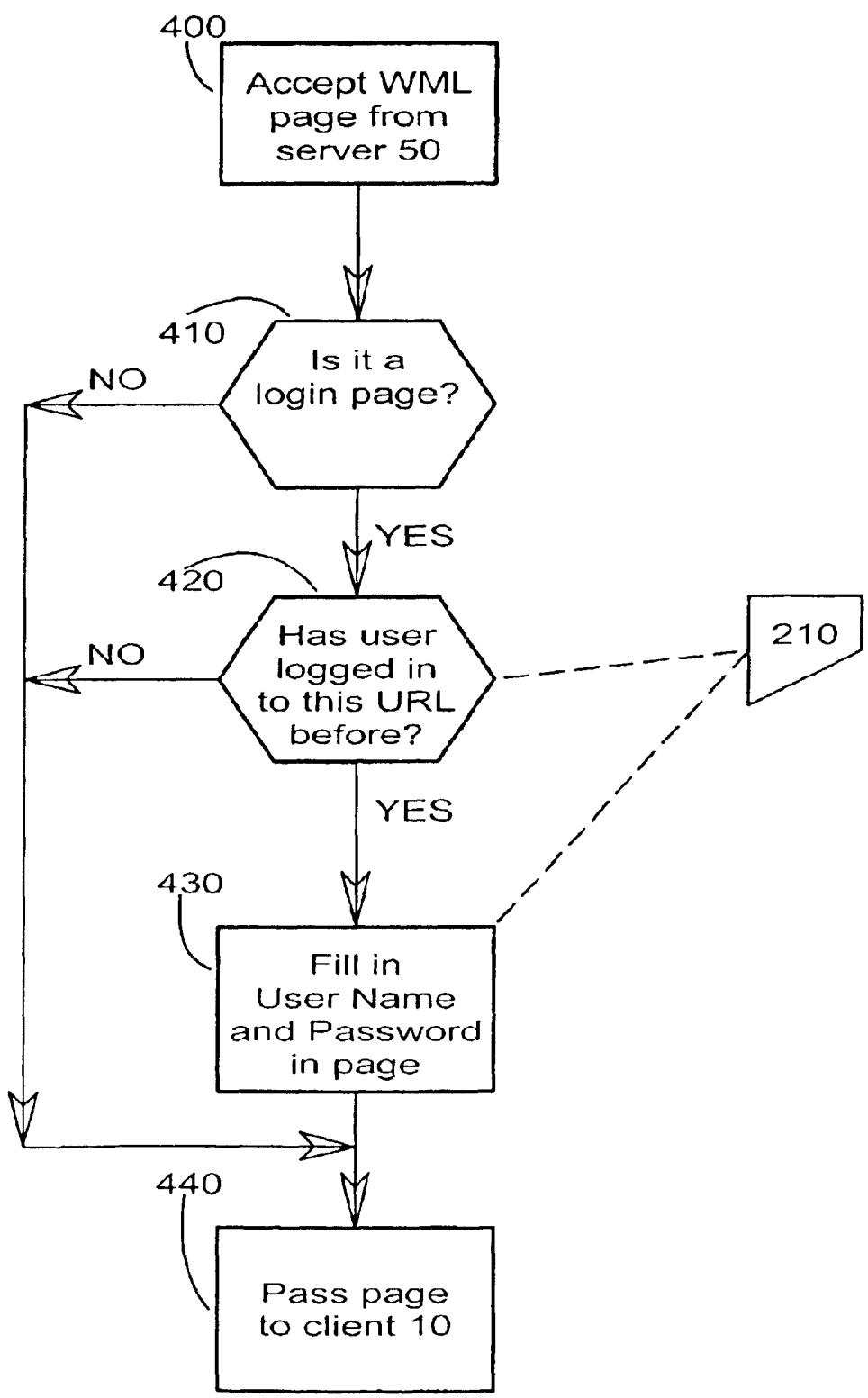
FIG. 4 is a flow chart of actions taking place in the AutoLogin proxy of FIG. 2 when a WML login page is passed from an Internet server to a wireless client.

FIG. 4 is a flowchart of actions pertinent to the present invention that take place in AutoLogin Proxy 200. By means known in the art, a user at a wireless client 10 initiates a request for content from a particular server; the request is passed through wireless network 20, WAP gateway 30, and Internet 40 to the requested (by URL) one of servers 50. Server 50 passes WML pages back toward wireless client 10, and enroute each WML page passes through WAP gateway 30 where the WML page is received into AutoLogin Proxy 200 as shown in block 400 of FIG. 4. Block 410 checks whether the page is a login page (a page on which the user is requested to provide the user-name/password pair). If the page is not a login page the present invention does not come into play relative to the page, and control dispatches to block 440 where the page is passed unchanged to wireless client 10. If the page is a login page, block 420 interrogates AutoLogin database 210 to determine whether the user (identified in the page by his User ID) has previously logged into the server which sent the page (identified in the page by URL).

If database 210 contains an entry for the identified user and the identified server, the username and password fields of the entry are filled in on the WML page by block 430. Control passes to block 440 which sends the page to the wireless client 10. (An alternative would be to return the page to the server 50 for login using the user-name/password pair retrieved from database 210, but in the presently preferred embodiment the page is forwarded to the client for approval. If the client approves, he may simply enter a "go" indication indicating he wishes to log in using that user-name/password pair.)

Figure 5:
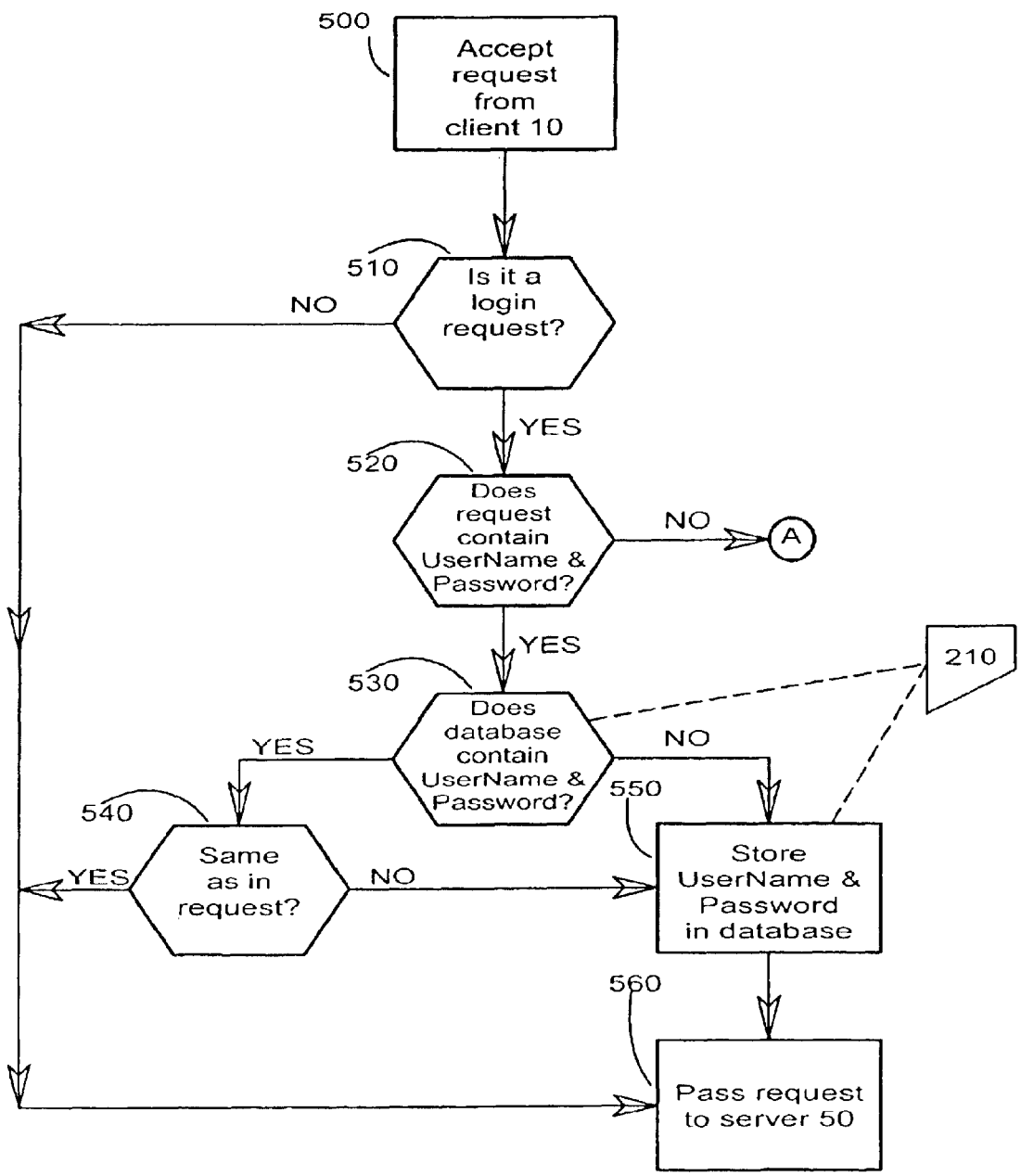
FIG. 5 is a flow chart of actions taking place in the AutoLogin proxy of FIG. 2 when a login request is passed from a wireless client to an Internet server.

FIG. 5 is a flowchart of actions in AutoLogin Proxy 200 when a login request originating from a wireless client 10 is being sent toward a server 50. The request is received at block 500 and block 510 determines whether it is a login request. At block 520 the request is checked as to whether it contains a user-name/password pair. If it does not, control passes to an unspecified path denoted as "A". For a wireless client 10 to return a login request without a username/password pair constitutes an operator error, the handling of which does not bear on the present invention and is a design choice.

At block 530, database 210 is interrogated as to whether database 210 contains a username/password pair for the present user and present URL. If not, or if the pair in database 210 is different from the pair contained in the present request as determined at block 540, the pair contained in the request is stored into database 210 in order to perform AutoLogin on subsequent occasions that the same user requests content from the same server. The request is then forwarded from block 560 to the server 50 where it will result in logging in the user. Subsequent pages sent back to the user from server 50 under the current login will not invoke the present invention, as they will cause block 410 to exit on the NO path. Similarly, subsequent requests from wireless client 10 under the current login will not invoke the present invention, as they will cause block 510 to exit on the NO path.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of logging users of mobile terminals in to wide-area network (WAN) servers in a system for connecting users at wireless terminals to WAN servers via a wireless telephone network connected to a WAN gateway, comprising the steps of:
 (a) determining in the gateway whether a particular user has previously logged in to a particular server of the WAN servers, wherein the gateway stores login information for a plurality of the WAN servers that the particular user has previously logged in to,
 (b) and if the particular user has not previously logged in to the particular server:
  (b1) storing in the gateway login information provided by the particular user for logging the particular user in to the particular server; and
  (b2) forwarding the login information provided by the particular user to the particular server;
 (c) and if the particular user has previously logged in to the particular server:
  (c1) retrieving in the gateway stored login information provided by the particular user for logging the particular user in to the particular server;
   (c1A) forwarding the retrieved login information to the particular user's wireless terminal for possible modification by the user;
   (c1B) returning the retrieved login information from the wireless terminal to the gateway; and
  (c2) forwarding the retrieved login information to the particular server.

2. The method of claim 1 wherein the WAN is the Internet.

3. The method of claim 1 wherein said login information comprises a user name and a password.

4. The method of claim 1 wherein a user is identified according to a telephone number of said user's mobile terminal.

5. The method of claim 2 wherein a server is identified according to its uniform resource locator (URL).

6. The method of claim 1 wherein said step (a) is performed in response to a login request received from the particular user for logging into the particular server.

7. The method of claim 6 wherein the login request received from the user includes login information, wherein after step (c1) and before step (c2) are the steps:
 comparing the received login information to the stored login information; and
 storing the received login information if the stored login information is different than the received login information.

8. The method of claim 1 wherein step (a) is performed in response to receipt of a WML page at the gateway from the particular server, the WML page comprising a login page.

9. Apparatus for logging users of mobile terminals in to wide-area network (WAN) servers in a system for connecting users at wireless terminals to WAN servers via a wireless telephone network connected to a WAN gateway, comprising:
 a data store in the gateway for storing, for each user, correlations of:
  WAN servers to which the user has logged in; and
  login information for each of the WAN servers to which the user has logged in,
 first logic in the gateway for receiving a login request for a particular server and for determining according to the data store whether the server is one of the WAN servers to which the user has previously logged in;
 second logic in the gateway conditioned by the first logic for forwarding to the user the solicitation of login information, for receiving solicited login information from the user, and for storing the login information in the data store if the first logic has determined that the user has not previously logged in to the server;

third logic in the gateway conditioned by the first logic for retrieving login information from the data store if the first logic has determined that the user has previously logged in to the server wherein the third logic forwards the login information to the user for possible modification and accepts the login information back from the user regardless of whether modified; and fourth logic in the gateway for forwarding the stored login information to the server.

10. The apparatus of claim 9 wherein the WAN is the Internet.

11. The apparatus of claim 9 wherein further the third logic stores login information in the data store if modified by the user.

12. The apparatus of claim 9 wherein said login information comprises a user name and a password.

13. The apparatus claim 9 wherein a user is identified according to a telephone number of said user's mobile terminal.

14. The apparatus of claim 10 wherein a server is identified according to its uniform resource locator (URL).

15. The apparatus of claim 9 wherein said first logic receives said login request from the particular user.

16. The apparatus of claim 15 wherein the login request includes login information, said third logic being operative for comparing the received login information and the stored login information and storing the received login information if the stored login information is different than the received login information.

17. The apparatus of claim 9 wherein said first logic receives said login request from the particular server.

* * * * *